(No Model.)

L. W. HUSK.
DREDGE BOX.

No. 247,358. Patented Sept. 20, 1881.

WITNESSES:
Paul Jacobs.
Orb Norton

INVENTOR:
Lewis W. Husk
BY Francis C. Bowen
ATTORNEY.

UNITED STATES PATENT OFFICE.

LEWIS W. HUSK, OF ALBANY, NEW YORK.

DREDGE-BOX.

SPECIFICATION forming part of Letters Patent No. 247,358, dated September 20, 1881.

Application filed April 23, 1881. (No model.)

*To all whom it may concern:*

Be it known that I, LEWIS W. HUSK, of Albany, in the county of Albany and State of New York, have invented certain new and useful Improvements in Dredge-Boxes; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

My invention relates to vessels for holding and distributing separately different kinds of seasonings, such as salt and pepper, and also for powder of various kinds.

The invention consists in a novel construction of a box or vessel containing another box or vessel provided with a foraminous lid and a foraminous cover or cap fitting over and sliding around upon said lid, as hereinafter more particularly described.

Figure 1:
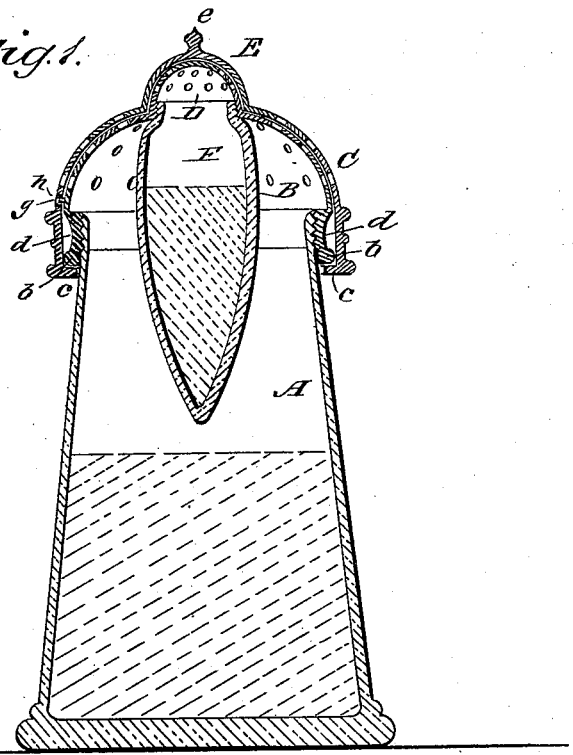
Figure 2:
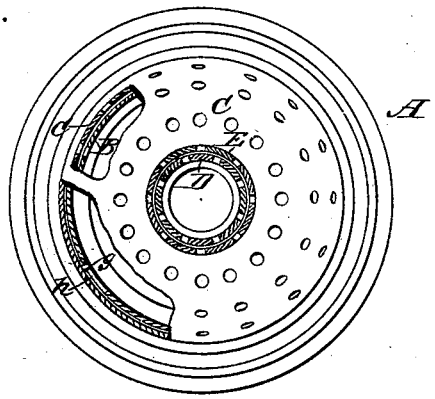

In the accompanying drawings, Figure 1 represents a vertical section of a vessel constructed according to my invention; and Fig. 2 is a top view of the same, partly broken away.

A is a vessel or box, constructed of glass, tin, wood, or any other suitable material, made with fluted sides or otherwise, for holding one kind of seasoning, provided with a perforated or foraminous lid, B, thereto attached by means of screw-threads in the usual manner. This lid is provided with a perforated or foraminous dome, D, in its upper part, screw-threaded on part of its inner surface.

F is a vessel or box, screw-threaded at its neck for attaching it to the dome D.

C is a perforated or foraminous cap, having a dome, E, also foraminous, and a knob, e, for revolving it, and fitting closely over and revolving upon the lid B and dome D. It is attached by means of a flange, c, projecting inwardly from its lower part, which is sprung over a bead, b, on the lid B, as shown in the drawings. The perforations or foramina in the dome E and the cap C are arranged in lines radiating from the center thereof; but the radial lines of the foramina in the dome are so directed that they would, if extended, be between the lines of foramina in the other part of the cap, so that when the foramina in the dome of the lid and those in the dome-cap correspond those in the outer and lower parts of the lid and cap do not, thus allowing but one kind of seasoning to be distributed at a time. The cap is prevented from revolving too far by means of a stud, $g$, and slot $h$, the stud being either on the lid and working in a slot in the cap, as shown in Fig. 1, or on the cap and working in a slot in the lid, as shown in Fig. 2.

The mode of operation of my invention is as follows: In order to fill the vessel with seasoning the upper parts are unscrewed from the vessel A, which can then be nearly filled, leaving a little space for the material that will be displaced on the replacing of the inner vessel, F. To fill the inner vessel, F, it is unscrewed from the lid B in the ordinary manner.

When it is desired to distribute the seasoning from the inner vessel the cap is turned until the foramina of the domes correspond. To distribute seasoning from the outer vessel the cap is turned in the reverse direction until the foramina of the outer and lower parts of the cap and the lid correspond. The stud $g$ is intended to indicate when the foramina of either part of the cap correspond with the proper parts of the lid by reaching the end of its slot $h$ and preventing further revolution of the cap.

The advantage of my invention over former combined dredge-boxes is that while in my invention one kind of seasoning is perfectly prevented from passing into the vessel containing the other kind, yet it is comparatively simple in construction.

I am aware that combined dredge-boxes have been heretofore made which are much more simple than my invention; but they do not keep the various condiments separate perfectly.

I am also aware that Letters Patent have been heretofore granted for combined dredge-boxes which perfectly prevent the condiments from intermixing with each other; but the inventions so patented have been much more complicated and costly than my invention, and also more delicate and liable to get out of order.

My invention has been particularly described in reference to the construction of a vessel or box containing another vessel, each provided with foraminous tops; but it is equally applicable to the employment of a single vessel provided with tops having perforations in them, as described, so that it can be used for powder and other like substances, if necessary.

Having thus described my invention, what I claim as new, and desire to secure by Letters Patent, is—

The combination of the outer vessel, A, having the lid B, adapted to be screwed thereon, and provided with the bead b, the inner vessel, F, the cap or cover C fitted over said lid B and adapted to be sprung into place over the bead b, and the stud g and slot h in said lid and cover, all arranged and operating as herein shown and described.

In testimony that I claim the foregoing I have hereunto set my hand this 20th day of April, 1881.

LEWIS W. HUSK.

Witnesses:
FRANCIS C. BOWEN,
EDGAR GARRETSON.